United States Patent Office 3,475,544
Patented Oct. 28, 1969

3,475,544
CONDUCTOR SPACERS FOR MULTI-CONDUCTOR ELECTRICAL OVERHEAD TRANSMISSION LINES
Alun John Reed, Leicester, England, assignor to The Dunlop Company Limited, London, England, a British company
Filed Apr. 29, 1968, Ser. No. 725,085
Claims priority, application Great Britain, May 3, 1967, 20,428/67
Int. Cl. H02g 7/14
U.S. Cl. 174—42                                    14 Claims

ABSTRACT OF THE DISCLOSURE

A conductor spacer for bundled overhead electrical transmission lines comprises conductor clamps connected with a rigid spacer frame by flexible rubber joints which permit limited relative longitudinal movements of the conductors and limited relative transverse movements of the conductors with a freedom of movement which is at least as great horizontally as it is vertically in use of the spacer.

---

Figure 1:
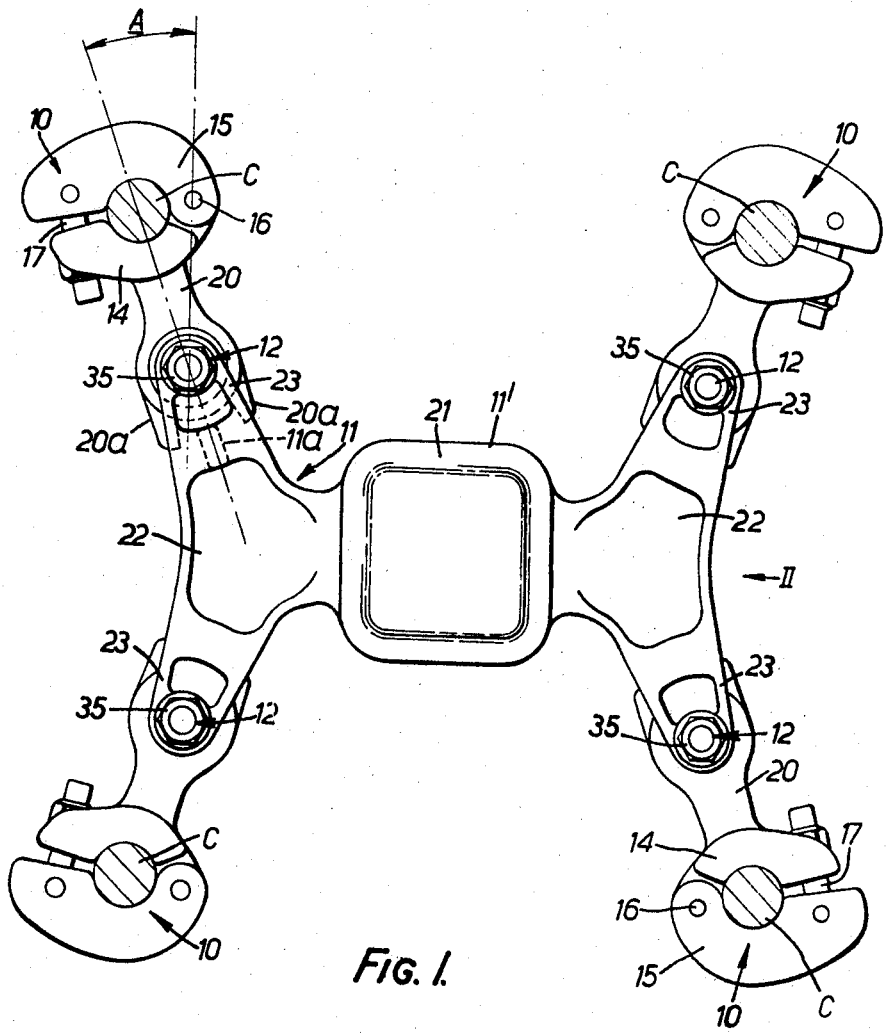

The invention concerns improvements relating to conductor spacers for electrical overhead transmission lines having a plurality of spaced apart conductors.

The primary function of a conductor spacer is to maintain the spaced apart conductors of a set or bundle of conductors at a desired minimum spacing relative to each other despite wind movements and, possibly, unequal stretching, whilst at the same time accommodating limited relative longitudinal movements of the conductors due to these causes.

The spacers constitute nodal points where clamped to each conductor. Difficulties arise due to low frequency vibrations of the individual conductors between these nodal points and between the suspension nodes of the conductors on the towers or pylons, induced by air movement, causing wear and strain on the conductor spacers and particularly on the clamps of the spacer and fatigue failure of the conductor strands at the suspension nodes. It has been noted that such low frequency vibrations occur mainly in a direction horizontally transverse of the conductors, although wind induced vertical vibrations do also occur.

An object of the invention is to provide a conductor spacer which acts to absorb, damp out and break up such horizontally transverse low frequency vibrations of the individual conductors by the use of energy absorbing elements of rubber or the like material (hereinafter referred to generally as "rubber") incorporated in the spacer, and which spacer at the same time will adequately perform the primary "spacer" function.

According to the invention there is provided a conductor spacer for electrical overhead transmission lines having a plurality of spaced apart conductors, comprising a rigid spacer frame, a plurality of clamp means one clamp means to grip each of the spaced apart conductors, and respective flexible rubber joint means by which each clamp means is connected to the spacer frame so as to permit limited longitudinal movement of the conductors relative to one another and allow each clamp means a predetermined range of movement relative to the spacer frame and the other clamp means in a direction transverse of the conductors, in use of the spacer.

Advantageously the arrangement is such as to allow each clamp means limited movement relative to the spacer frame and at least one other clamp means in a direction horizontally transverse of the conductors, in use of the spacer. Thus each clamp means is allowed movement in the horizontally transverse direction to damp horizontally transverse low frequency vibrations of the individual conductors, in use of the spacer.

Each clamp means may be also allowed limited movement relative to the spacer frame and at least one other clamp means in a direction vertically transverse of the conductors.

Preferably each flexible rubber joint means allow the relative transverse movement of the clamp means mainly by torsional shear deformation of the rubber of the joint means.

Suitably each clamp means is connected to the spacer frame by a respective single flexible rubber joint means.

Each rubber joint means preferably comprises rubber bushing disposed with an axis extending in a direction longitudinally of the conductors in use of the spacer.

Stop means may be provided to limit the degree of transverse movement of each clamp means relative to the spacer frame.

Preferably each clamp means comprises jaw means to grip the respective conductor and an arm extending between said jaw means and the respective rubber joint means, and the arrangement is such that the effective moment arm of the jaw means and conductor gripped thereby about the rubber joint means in rest condition is inclined at an acute angle to a direction vertically transverse of the conductors. Said angle may be less than 45°, or approximately 45°.

Figure 2:
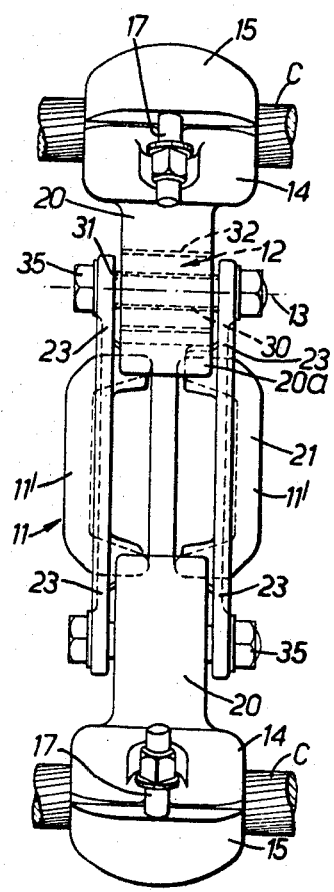
Figure 3:
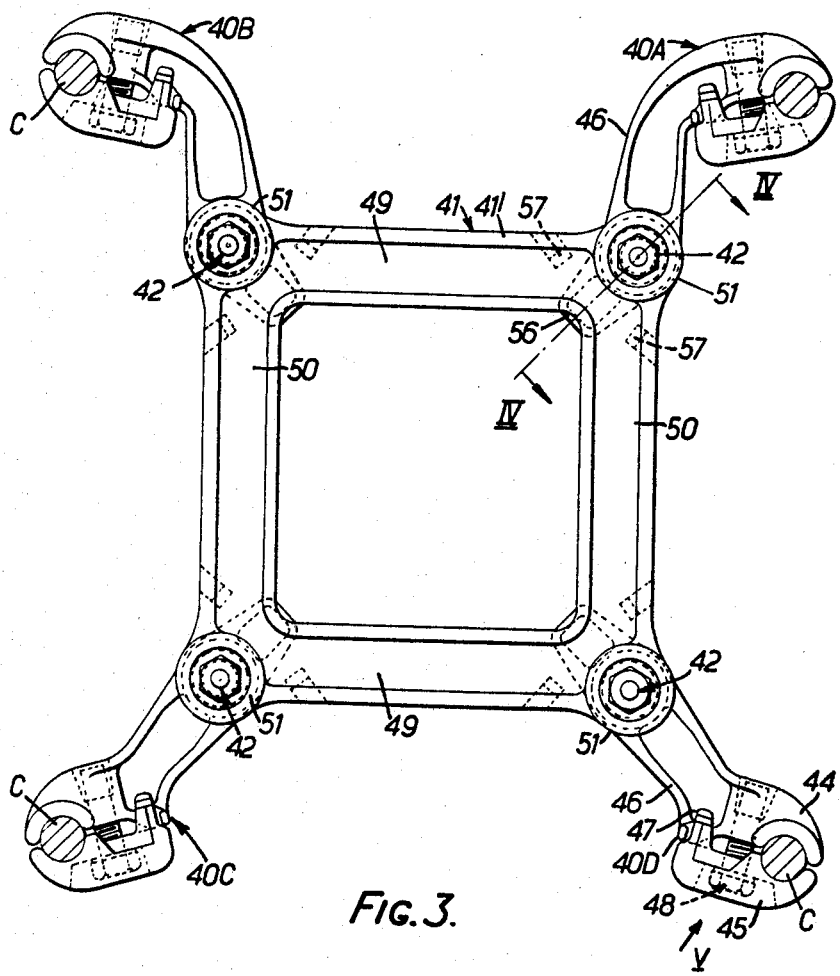
Figure 4:
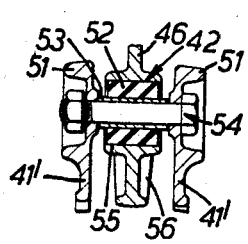
Figure 5:
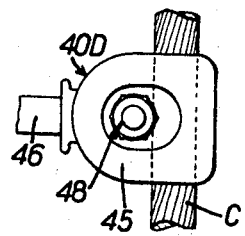

Specific embodiments of spacers according to the invention are hereinafter described by way of example with reference to the accompanying drawings wherein:

FIG. 1 is a front view of one form of spacer,
FIG. 2 is a side view in the direction II of FIG. 1,
FIG. 3 is a front view of another form of spacer,
FIG. 4 is a section on the line IV—IV of FIG. 3, and
FIG. 5 is a view in the direction V of FIG. 3.

Referring to FIGS. 1 and 2, a quadruple conductor spacer is shown as used for a set or bundle of four conductors C to be spaced apart so as to be disposed in transverse section at the corners of an imaginary quadrangle having horizontal and vertical sides. The spacer comprises four clamp means 10 quadrangularly disposed one to grip each conductor and connected to a rigid spacer frame 11 each by a flexible rubber joint means 12 having an axis 13 extending in a direction longitudinally of the conductors.

Each clamp means 10 comprises jaws 14, 15 connected by a hinge pin 16 and drawn together by a swing bolt and nut means 17 to grip the respective conductor. A lever arm 20 integral with the inner jaw 14 extends between the jaw means at the outer end of the arm and the respective rubber joint at the inner end of the arm.

The spacer frame is of generally H-form and comprises a pair of separate parts 11′ each having an integrally weighted cross-piece 21 and generally vertically extending side pieces 22 presenting respective upper and lower members 23.

Each arm 20 is mounted between the respective members 23 of the frame, by means of the respective rubber joint. Each rubber joint comprises a cylindrical rubber bush 30 disposed on the axis 13 and having inner and outer metal sleeves 31 and 32 bonded or otherwise united with the respective inner and outer surfaces thereof. The inner metal sleeve projects beyond the end of the rubber bush at each end and is clamped endwise between the frame members 23 by bolt and nut securing means comprising a bolt 35 lying along the joint axis and passing through the inner sleeve and through aligning holes in the frame members. The outer metal sleeve 32 is force fitted in a corresponding bore in the arm 20 so that the bush is fixedly housed in the bore and transverse angular or rotational movement of the arm 20 with respect to the spacer frame is allowed by torsional shear deformation of the rubber.

Each arm 20 presents a pair of stops 20a lying one to each side of complementary stop means 11a presented by the spacer frame to engage therewith to limit the extent of the transverse angular movement which the arm 20 may make with respect to the frame 11 about the respective joint axis.

In the normal unstressed rest condition of each rubber bush 30, as drawn, the arrangement is such that the respective arm 20, and likewise the effective moment arm of the clamp jaw means and conductor gripped thereby about the respective joint axis, makes an acute angle A with the vertical in the intended orientation of the spacer.

In the present examples the angle A is less than 45° and approaches nearer to 0°, being suitably a small angle of about 20° as shown. Thus, each clamp means with its conductor is allowed movement relative to the spacer frame and the other clamp means in a direction transverse of the conductors, mainly in the horizontal transverse direction, mainly by the torsional shear of the rubber within the predetermined range of movements imposed by the stop means 11a 20a.

Relative vertical movements of the clamp means and conductors are permitted to a much lesser extent than the relative horizontal movements and with much less freedom because of the small angle the arms 20 make with the vertical.

In the longitudinal direction of the conductors, the conductors are permitted to make relative longitudinal movements mainly by deformation of the rubber bushes conically in compression.

The transverse movement of the clamp means and conductors allowed by the rubber joints with respect to the spacer frame take place in response to low frequency vibrations of the individual conductors, particularly in a horizontal transverse direction of the conductors and such vibrations are, in consequence, damped and broken up. Low frequency vibrations of the conductors in a vertical transverse direction are also damped and broken up.

As the range of relative angular movements of the clamp means and the frame are positively limited by the stop means 11a, 20a, a minimum spacing is maintained between the conductors by the spacer which thus performs its primary function.

If three of the conductors are regarded as fixed, relative transverse movement of the fourth conductor is accommodated solely by the rubber joint associated with the fourth conductor. However, in practice, transverse movements of one conductor tend to be transmitted to the others through the spacer frame. Accordingly, transverse horizontal movement of any one conductor tends to bring about deflection of all the rubber joints, which then act to absorb, damp out and break up the movements of all the conductors.

The damping properties of the spacer described may be in part ascribed to damping work done in the rubber of the joints due to the distortion of the rubber. Inertia damping is also obtained due to the mass of the frame 11 attached to the conductors by spring means constituted by the rubber of the joints. Thus the mass of the frame 11 may be made such as to obtain inertia damping of a particular frequency or range of frequency of transverse vibration of the conductors. The inertia damping characteristics of the spacer may thus complement its distortion damping characteristics.

The spacer shown in FIGS. 3 to 5 is again a quadruple conductor spacer for four conductors C to be spaced apart in a disposition similar to that already described, and comprises four clamp means 40A, 40B, 40C, and 40D connected to a rigid spacer frame 41 each by a respective flexible rubber joint means 42, basically as described above.

Each clamp means comprises jaws 44, 45 of spade form. The inner jaw 44 is integral with a lever arm 46. The outer jaw has a pair of retaining ears 47 turned in at each side of the inner jaw and arm unit. The jaws are drawn together by a bolt means 48 to grip the respective conductor. The bolt may be then spot peened to retain it. The arm 46 extends between the jaw means at the outer end of the arm and the respective rubber joint at the inner end of the arm. The upper clamp means 40A and 40B are of somewhat different configuration to the lower clamp means 40C and 40D so that the inner jaw unitary with the lever arm overlies the respective conductor and outer jaw in a near horizontal attitude which may assist installation.

The spacer frame 41 is of open rectangular or square form and comprises a pair of separate parts 41′ each having a pair of horizontal sides 49 and a pair of vertical sides 50. The four corners of the frame parts present opposed joint locating formations 51.

Each arm 46 is mounted between the respective formations 51 of the frame, by means of the respective rubber joint. Each rubber joint comprises a cylindrical rubber bush 52, an inner metal sleeve 53, and bolt and nut means 54, substantially as above except that the rubber bush at its outer surface is bonded or otherwise united or force fitted directly in the corresponding bore 55 in the lever arm, again so that the bush is fixedly housed in the bore and transverse angular or rotational movement of the arm with respect to the frame is allowed by torsional shear deformation of the rubber.

Each arm 46 presents a stop 56 lying between complementary stops 57 presented by the spacer frame to limit the extent of the transverse angular movement of the arm, as before.

Again, in the rest condition as drawn, the effective moment arm of each clamp jaw means and conductor gripped thereby about the respective joint axis makes an acute angle with the vertical. In this example, the angle is equal to or approximately 45°. From this intermediate rest position, the stop means allow a range of movement of approximately 20° in either direction.

Thus, each clamp means with its conductor is allowed movement relative to the spacer frame and the other clamp means in a direction transverse of the conductors, to an equal or substantially equal extent in both the horizontal and vertical transverse directions, by the torsional shear of the rubber, so as to have the same distortion damping characteristics in the horizontal and vertical directions. Otherwise, the spacer functions as described with reference to the example of FIGS. 1 and 2.

A triple conductor spacer according to this invention may be constructed generally as described with reference to FIGS. 3, 4 and 5 but employing a triangular, rigid spacer frame of two part construction like the frame 41 and three clamp means such as described with reference to FIG. 3 for the conductors connected to the spacer frame each by a respective flexible rubber joint means such as 42.

In the rest condition, the effective moment arm of each clamp jaw means and conductor gripped thereby about the respective joint axis would make an acute angle with the vertical for example so that each clamp means with its conductor is allowed movement relative to the spacer frame and the other clamp means, in a direction transverse of the conductors, to an equal, substantially equal, or different extents in both the horizontal and vertical transverse directions so as to function as described with reference to the example of FIGS. 1 and 2 or the example of FIGS. 3, 4 and 5.

A twin conductor spacer according to this invention may be constructed as in the upper part of FIG. 3 so as to comprise a pair of clamp means such as 40A, 40B, connected to a rigid, straight, bar-like spacer frame of composite construction, each by a respective flexible rubber joint means such as 42.

The frame in this case may comprise a pair of separate parts presenting at each end opposed joint locating formations such as 51, and the lever arms such as 46 of the clamp means are mounted between the respective formations by means of the respective rubber joints.

Each lever arm may present a stop lying between complementary stops presented by the spacer frame to limit the extent of the transverse angular movement of the arm, as before and this applies also to the triple conductor spacer described above.

In the rest condition of the twin spacer just described the effective moment arm of each clamp jaw means and conductor gripped thereby about the respective joint axis makes an acute angle with the vertical. This angle may be equal to or approximately 45° or less than 45°. From this intermediate rest position the stop means allow a range of movement of approximately 20° in either direction.

Thus, the spacer may function as described with reference to the example of FIGS. 1 and 2 or FIGS. 3, 4 and 5.

One or both of the frame parts may have a weight removably or permanently attached thereto to increase the inertia damping effect and the weight or weights may be carried inside a housing formed by the frame parts.

The rubber joints have been described as comprising cylindrical rubber bushes, but it will be understood that they may comprise substantially cylindrical rubber bushes or other forms of rubber bushing providing the required effect.

Where movement of any clamp means and conductor has been described as being horizontally or vertically transverse of the conductors, this covers movement having a transverse horizontal or vertical component of movement.

I claim:
1. A conductor spacer for electrical overhead transmission lines having a plurality of spaced apart conductors, comprising:
   a rigid spacer frame;
   a plurality of clamp means, one clamp means to grip each of the spaced apart conductors; and
   respective flexible rubber joint means connecting each clamp means to the spacer frame so as to permit limited longitudinal movement of the conductors relative to one another and to allow each clamp means a predetermined range of movement relative to the spacer frame and the other clamp means in a direction transverse of the conductors;
   each clamp means comprising jaw means to grip the respective conductor and an arm extending between said jaw means and the respective rubber joint means, said arm being dimensioned such that the effective moment arm of the jaw means and conductor gripped thereby about the rubber joint means in a rest condition is inclined at an acute angle to a direction vertically transverse of the conductors, the flexible rubber joint means allowing said relative longitudinal movement of the conductors mainly by deformation of the rubber of the joint means in compression and the relative transverse movement of the clamp means mainly by torsional shear deformation of the rubber of the joint means;
   the mass of said spacer frame, the flexibility of said rubber joint means and the angle which said effective moment arms make to the direction vertically transverse of the conductors in a rest condition being chosen such that the spacer acts to absorb, damp out and break up transverse low frequency vibrations of the conductors within a predetermined range.

2. A spacer according to claim 1 wherein each clamp means is connected to the spacer frame by means of a respective single flexible rubber joint means.

3. A spacer according to claim 1 wherein each rubber joint means comprises a rubber bushing disposed with an axis extending in a direction longitudinally of the conductors.

4. A spacer according to claim 3 wherein the rubber bushing comprises a substantially cylindrical rubber bush.

5. A spacer according to claim 1 wherein each rubber joint means comprises a substantially cylindrical rubber bush disposed with an axis extending in a direction longitudinally of the conductors; and an inner metal sleeve secured to the inner surface of said rubber bush; and wherein said spacer frame includes respective pairs of spaced apart portions, clamping means being provided to clamp said sleeve between a pair of spaced portions of the spacer frame, an outer surface of said bush being secured to the respective clamp means.

6. A spacer according to claim 1 wherein stop means is provided to limit the degree of transverse movement of each clamp means relative to the spacer frame.

7. A spacer according to claim 6 wherein the arm of each clamp means and the spacer frame include complementary stop portions to limit the degree of transverse movement of the clamp relative to the spacer frame.

8. A spacer according to claim 1 wherein said angle is less than 45°.

9. A spacer according to claim 1 wherein said angle is approximately 45°.

10. A spacer according to claim 1 wherein the arm of each clamp means includes a bore therein and each rubber joint means includes a substantially cylindrical rubber bush fixedly housed in said bore in its respective arm.

11. A spacer according to claim 1 wherein the spacer frame comprises a pair of separate parts, the rubber joint means being clamped therebetween by securing means lying along the axes of the rubber joint means.

12. A spacer according to claim 1 comprising four clamp means quadrangularly disposed and respectively connected by means of four rubber joint means to the spacer frame.

13. A spacer according to claim 1 comprising two clamp means respectively connected by means of two rubber joint means to the spacer frame.

14. A spacer according to claim 1 comprising three clamp means respectively connected by means of three rubber joint means to the spacer frame.

References Cited

UNITED STATES PATENTS 3,083,258   3/1963   Edwards et al. _____ 174—146 X

FOREIGN PATENTS 584,633   10/1959   Canada.
1,028,258   5/1966   Great Britain.

OTHER REFERENCES

Herzig: German printed application No. 1,159,053, published Dec. 12, 1963.

Wigotsky: "Silicone-Rubber Washers Soothe Vibrating Transmission Lines," Design News, Aug. 18, 1965, pp. 114 and 115.

LARAMIE E. ASKIN, Primary Examiner

U.S. Cl. X.R.

174—146